(12) United States Patent
Chen et al.

(10) Patent No.: US 12,583,024 B2
(45) Date of Patent: Mar. 24, 2026

(54) METHOD FOR DISPOSAL OF PHOTOCURED WASTE BY PHOTOOXIDATION-CATALYTIC PYROLYSIS COUPLING

(71) Applicants: Tianjin University of Commerce, Tianjin (CN); Tianjin University, Tianjin (CN)

(72) Inventors: Guanyi Chen, Tianjin (CN); Yunan Sun, Tianjin (CN); Junyu Tao, Tianjin (CN); Hongnan Zhang, Tianjin (CN); Beibei Yan, Tianjin (CN); Zhanjun Cheng, Tianjin (CN); Biyu Wang, Tianjin (CN)

(73) Assignees: Tianjin University of Commerce, Tianjin (CN); Tianjin University, Tianjin (CN)

( * ) Notice: Subject to any disclaimer, the term of this patent is extended or adjusted under 35 U.S.C. 154(b) by 127 days.

(21) Appl. No.: 18/605,773

(22) Filed: Mar. 14, 2024

(65) Prior Publication Data

US 2024/0307933 A1 Sep. 19, 2024

(30) Foreign Application Priority Data

Mar. 17, 2023 (CN) .......................... 202310258471.1

(51) Int. Cl.
| | |
|---|---|
| *B09B 3/50* | (2022.01) |
| *B09B 3/35* | (2022.01) |
| *B09B 101/75* | (2022.01) |

(52) U.S. Cl.
CPC .................. *B09B 3/50* (2022.01); *B09B 3/35* (2022.01); *B09B 2101/75* (2022.01)

(58) Field of Classification Search
CPC ......... B09B 3/35; B09B 3/50; B09B 2101/75; C10G 55/06; C10G 2300/1003; C10G 2400/30
See application file for complete search history.

(56) References Cited

FOREIGN PATENT DOCUMENTS

CN          114101297 A    *    3/2022    ............... B09B 5/00

OTHER PUBLICATIONS

Sun et al., Pyrolysis properties and kinetics of photocured waste from photopolymerization-based 3D printing: A TG-FTIR/GC-MS Study, Waste Management, vol. 150, Aug. 1, 2022, pp. 151-160 (Year: 2022).*

* cited by examiner

*Primary Examiner* — Ishal V Vasisth
(74) *Attorney, Agent, or Firm* — Procopio, Cory, Hargreaves & Savitch LLP

(57) ABSTRACT

Provided is a method for disposal of a photocured waste by photooxidation-catalytic pyrolysis coupling. The method includes: subjecting a photocured waste to be disposed to photooxidation, and subjecting a resulting photocured waste after the photooxidation to catalytic pyrolysis; where the photooxidation is conducted by subjecting the photocured waste to be disposed to irradiation with ultraviolet light in air. In the method for disposal of the photocured waste by the photooxidation-catalytic pyrolysis coupling provided by the disclosure, the photocured waste to be disposed is subjected to the photooxidation, and the resulting photocured waste after the photooxidation is subjected to the catalytic pyrolysis.

5 Claims, No Drawings

METHOD FOR DISPOSAL OF PHOTOCURED WASTE BY PHOTOOXIDATION-CATALYTIC PYROLYSIS COUPLING

CROSS REFERENCE TO RELATED APPLICATION

This patent application claims the benefit and priority of Chinese Patent Application No. 202310258471.1 filed with the China National Intellectual Property Administration on Mar. 17, 2023, the disclosure of which is incorporated by reference herein in its entirety as part of the present application.

TECHNICAL FIELD

The present disclosure relates to the technical field of fuel oil preparation through pyrolysis of photocured wastes, and in particular to a method for disposal of a photocured waste by photooxidation-catalytic pyrolysis coupling.

BACKGROUND

Liquid photosensitive resin is laminated by photocuring to generate a three-dimensional entity, which has been widely used in various industries. During production and use of the three-dimensional entity, a solid waste, namely photocured waste, is inevitably produced. As a new type of organic solid waste, the output of the photocured waste will increase dramatically in many application scenarios in the future. However, there is currently no targeted disposal technology for the photocured waste. The photocured waste is only incinerated or landfilled with municipal solid waste, causing a certain degree of harm to the environment and resulting in a waste of resources.

Pyrolysis has been proven to be an environmental-friendly way for disposal of the photocured waste. The pyrolysis could effectively handle large amounts of waste while generating as few harmful pollutants as possible, and then produce high-value chemicals such as pyrolysis oil and pyrolysis gas. However, the photocured waste has a solid network structure, which requires high energy consumption for pyrolysis. Moreover, there are disadvantages such as high oxygen content in the pyrolysis oil and complex pyrolysis products that are difficult to separate, resulting in a poor direct utilization value.

A large number of current studies have shown that catalytic pyrolysis could effectively convert waste plastics into commercial pyrolysis oil. For example, the technology of aromatic hydrocarbons-rich oil is a promising means of resource utilization for waste plastics. However, the current catalytic pyrolysis of the photocured waste still suffers from low aromatic hydrocarbons yield and energy consumption that needs to be further reduced.

SUMMARY

An object of the present disclosure is to provide a method for disposal of a photocured waste by photooxidation-catalytic pyrolysis coupling, so as to solve the problems existing in the prior art. The method adopts the photooxidation-catalytic pyrolysis coupling to increase a yield of aromatic hydrocarbons in pyrolysis oil and further reduce an energy consumption of the catalytic pyrolysis.

To achieve the above object, the present disclosure provides the following technical solutions.

A first technical solution of the present disclosure provides a method for disposal of a photocured waste by photooxidation-catalytic pyrolysis coupling, including the following steps: subjecting a photocured waste to be disposed to photooxidation, and subjecting a resulting photocured waste after the photooxidation to catalytic pyrolysis; where the photooxidation is conducted by subjecting the photocured waste to be disposed to irradiation with ultraviolet light in air.

In some embodiments, the ultraviolet light has a wavelength of 254 nm to 405 nm, and preferably 365 nm.

The wavelength of the ultraviolet light has a certain influence on a yield of aromatic hydrocarbons in prepared pyrolysis oil. Below or above wavelength ranges mentioned above, a photoinitiator shows insensitivity, which is not conducive to the occurrence of oxidation reactions, and is not conducive to the improvement of pyrolysis oil quality and the removal of the photoinitiator. Therefore, in some embodiments of the present disclosure, the wavelength of ultraviolet light is limited to 254 nm to 405 nm.

In some embodiments, the irradiation is conducted at a power of 6 W to 85 W, and preferably 6 W. In some embodiments, the irradiation is conducted for 12 h to 288 h, and preferably 24 h.

The power and time of ultraviolet light irradiation have a certain influence on the yield of the aromatic hydrocarbons in the prepared pyrolysis oil. Below or above power ranges and time ranges mentioned above may reduce the yield of the aromatic hydrocarbons in the pyrolysis oil. Therefore, in the present disclosure, the power for irradiation is limited to 6 W to 85 W, and the time for irradiation is limited to 12 h to 288 h.

In some embodiments, the method further comprises grinding the photocured waste to be disposed into an 80-mesh powder before the photooxidation.

In some embodiments, the catalytic pyrolysis is conducted by using a molecular sieve catalyst; and the molecular sieve catalyst includes but is not limited to ZSM-5, HY, and Hβ.

The type of catalyst has a certain influence on the yield of the aromatic hydrocarbons in the pyrolysis oil (i.e., the quality of pyrolysis oil). If other catalysts commonly used in this field are selected, such as nano-magnesium oxide and nano-alumina, the yield of the aromatic hydrocarbons in the prepared pyrolysis oil is significantly lower than that using the molecular sieve catalyst.

In some embodiments, the catalytic pyrolysis is conducted at a temperature of 400° C. to 700° C., and preferably 600° C. In some embodiments, the catalytic pyrolysis is conducted for 10 min to 30 min, and preferably 30 min.

In some embodiments, during the catalytic pyrolysis process, the resulting photocured waste after the photooxidation and the catalyst are mixed uniformly in a mass ratio of 1:1 to obtain a mixed sample, and then the catalyst with a same mass (i.e., a ratio of a mass of the catalyst to a mass of the resulting photocured waste after the photooxidation is 1:1) is taken to cover a surface of the mixed sample for catalytic pyrolysis.

The catalyst is divided into two parts, where one part is thoroughly mixed with the photocured waste, while the other part is covered on the surface of the mixed sample to efficiently and fully utilize the catalyst.

A second technical solution of the present disclosure provides a method for improving a quality of pyrolysis oil prepared by catalytic pyrolysis of a photocured waste, including using the method for disposal of the photocured waste by the photooxidation-catalytic pyrolysis coupling described above.

A third technical solution of the present disclosure provides a method for reducing an energy consumption in preparation of pyrolysis oil by pyrolysis of a photocured waste, including using the method for disposal of the photocured waste by the photooxidation-catalytic pyrolysis coupling described above.

A technical concept of the present disclosure is as follows:

In the present disclosure, it is considered that current catalytic pyrolysis of a photocured waste still has disadvantages of a low aromatic hydrocarbons yield and a high energy consumption. At the same time, it is considered that there are harmful photoinitiators in the composition of the photocured waste that are not bound or weakly bound to the polymer chain, and these photoinitiators cannot be removed by pyrolysis or catalytic pyrolysis. Based on the fact that the photoinitiators could act as chromogenic groups that initiate photooxidation, treating the photocured waste through photooxidation could effectively remove the harmful photoinitiators in the photocured waste, thereby reducing subsequent pyrolysis energy consumption, affecting the composition of pyrolysis products, and improving the quality of pyrolysis oil. After a series of preliminary studies, it is found that photooxidation-catalytic pyrolysis coupling could significantly improve the yield of aromatic hydrocarbons in pyrolysis oil compared to that in direct catalytic pyrolysis of photocured waste.

Some embodiments of the present disclosure have the following technical effects:

In the method for disposal of a photocured waste by photooxidation-catalytic pyrolysis coupling provided by the present disclosure, a photocured waste to be disposed is subjected to the photooxidation, and a resulting photocured waste after the photooxidation is subjected to the catalytic pyrolysis. The method could significantly increase a yield of aromatic hydrocarbons in pyrolysis oil, thereby improving a quality of the pyrolysis oil.

DETAILED DESCRIPTION OF THE EMBODIMENTS

Some exemplary embodiments of the present disclosure are now described in detail. The detailed description should not be considered as a limitation to the present disclosure, but should be understood as a more detailed description of certain aspects, features, and implement solutions of the present disclosure.

It should be understood that terms described in the present disclosure are merely used to describe specific embodiments and are not intended to limit the present disclosure. In addition, for a numerical range in the present disclosure, it should be understood that each intermediate value between an upper limit and a lower limit of the range is also specifically disclosed. Each smaller range between any stated value or intermediate value in a stated range and any other stated value or intermediate value in the stated range is also included in the present disclosure. The upper and lower limits of these smaller ranges may independently be included or excluded from the range.

Unless otherwise specified, all technical and scientific terms used herein have the same meaning as commonly understood by those of ordinary skill in the art described in the present disclosure. Although the present disclosure describes merely preferred methods and materials, any methods and materials similar or equivalent to those described herein may also be used in the practice or testing of the present disclosure. All documents mentioned in this specification are incorporated by reference to disclose and describe methods and/or materials related to the documents. In case of conflict with any incorporated documents, the content of this specification should prevail.

It is obvious to those skilled in the art that several improvements and variations could be made to the specific embodiments of the present specification without departing from the scope or spirit of the present disclosure. Other embodiments derived from the specification of the present disclosure are obvious to those skilled in the art. The specification and examples of the present disclosure are merely exemplary.

As used herein, "including", "comprising", "having", "containing", and the like are all open-ended terms, which means including but not limited to.

In the examples of the present disclosure, a ZSM-5 molecular sieve catalyst used includes: cation type: H, sodium peroxide (wt %): 0.05, silica/alumina: 36, surface area (m$^2$/g): 350.

In the examples of the present disclosure, the raw materials used may be obtained from purchasing channels unless otherwise specified.

In the examples of the present disclosure, a photocured waste powder used is: a photocured waste prepared by printing Clear resin using a Formlabs Form3 printer, and then grinding into an 80-mesh powder with a pulverizer.

Example 1

A photocured waste powder was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 9.96%.

Example 2

A photocured waste powder and a catalyst (ZSM-5) were uniformly mixed in a ratio of 1:1 to obtain a mixture, and the catalyst with a same mass was covered on a surface of the mixture. The resulting sample was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 26.88%.

Example 3

A photocured waste powder was subjected to photooxidation by irradiating for 24 h with a wavelength of 365 nm and a power of 6 W.

A resulting photocured waste powder after the photooxidation was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 28.59%.

Example 4

A photocured waste powder was subjected to photooxidation by irradiating for 24 h with a wavelength of 365 nm and a power of 6 W.

A resulting photocured waste powder after the photooxidation and a catalyst (ZSM-5) were uniformly mixed in a ratio of 1:1 to obtain a mixture, and the catalyst with a same mass was taken to cover on a surface of the mixture. The resulting sample was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 65.42%.

Example 5

A photocured waste powder was subjected to photooxidation by irradiating for 24 h with a wavelength of 405 nm and a power of 6 W.

A resulting photocured waste powder after the photooxidation was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 11.53%.

Example 6

A photocured waste powder was subjected to photooxidation by irradiating for 24 h with a wavelength of 405 nm and a power of 6 W.

A resulting photocured waste powder after the photooxidation and a catalyst (ZSM-5) were uniformly mixed in a ratio of 1:1 to obtain a mixture, and the catalyst with a same mass was taken to cover on a surface of the mixture. The resulting sample was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 59.98%.

Example 7

A photocured waste powder was subjected to photooxidation by irradiating for 24 h with a wavelength of 405 nm and a power of 35W.

A resulting photocured waste powder after the photooxidation was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 11.6%.

Example 8

A photocured waste powder was subjected to photooxidation by irradiating for 24 h with a wavelength of 405 nm and a power of 35W to subject to photooxidation.

A resulting photocured waste powder after the photooxidation and a catalyst (ZSM-5) were uniformly mixed in a ratio of 1:1 to obtain a mixture, and the catalyst with a same mass was taken to cover on a surface of the mixture. The resulting sample was subjected to pyrolysis in a slide-rail tubular furnace at a temperature of 600° C. for 30 min. The pipeline was flushed with dichloromethane (DCM) and a resulting pyrolysis oil was collected. The DCM was evaporated using a rotary evaporator. A composition of the resulting pyrolysis oil was analyzed by GC-MS analysis software, where a yield of aromatic hydrocarbons was 64.93%.

The above examples are merely intended to describe the preferred embodiments of the present disclosure, but not to limit the scope of the present disclosure. Several variations and improvements made by a person of ordinary skill in the art based on the technical solutions of the present disclosure without departing from the design spirit of the present disclosure should fall within the scope of the appended claims of the present disclosure.

What is claimed is:

1. A method for improving a quality of pyrolysis oil prepared by catalytic pyrolysis of a photocured waste, the method comprising:

subjecting a photocured waste to be disposed to photooxidation; and subjecting a resulting photocured waste after the photooxidation to catalytic pyrolysis, wherein the photooxidation is conducted by subjecting the photocured waste to be disposed to irradiation with ultraviolet light in air, wherein the catalytic pyrolysis is conducted by using a molecular sieve catalyst, and wherein during the catalytic pyrolysis, the resulting photocured waste after the photooxidation and the molecular sieve catalyst are mixed in a mass ratio of 1:1 to obtain a mixed sample, and then the molecular sieve catalyst with a same mass is taken to cover a surface of the mixed sample for the catalytic pyrolysis.

2. The method of claim 1, wherein the ultraviolet light has a wavelength of 254 nm to 405 nm.

3. The method of claim 1, wherein the irradiation is conducted at a power of 6 W to 85 W for 12 h to 288 h.

4. The method of claim 1, wherein the method further comprises grinding the photocured waste to be disposed into an 80-mesh powder before the photooxidation.

5. The method of claim 1, wherein the catalytic pyrolysis is conducted at a temperature of 400° C. to 700° C. for 10 min to 30 min.

* * * * *